UNITED STATES PATENT OFFICE.

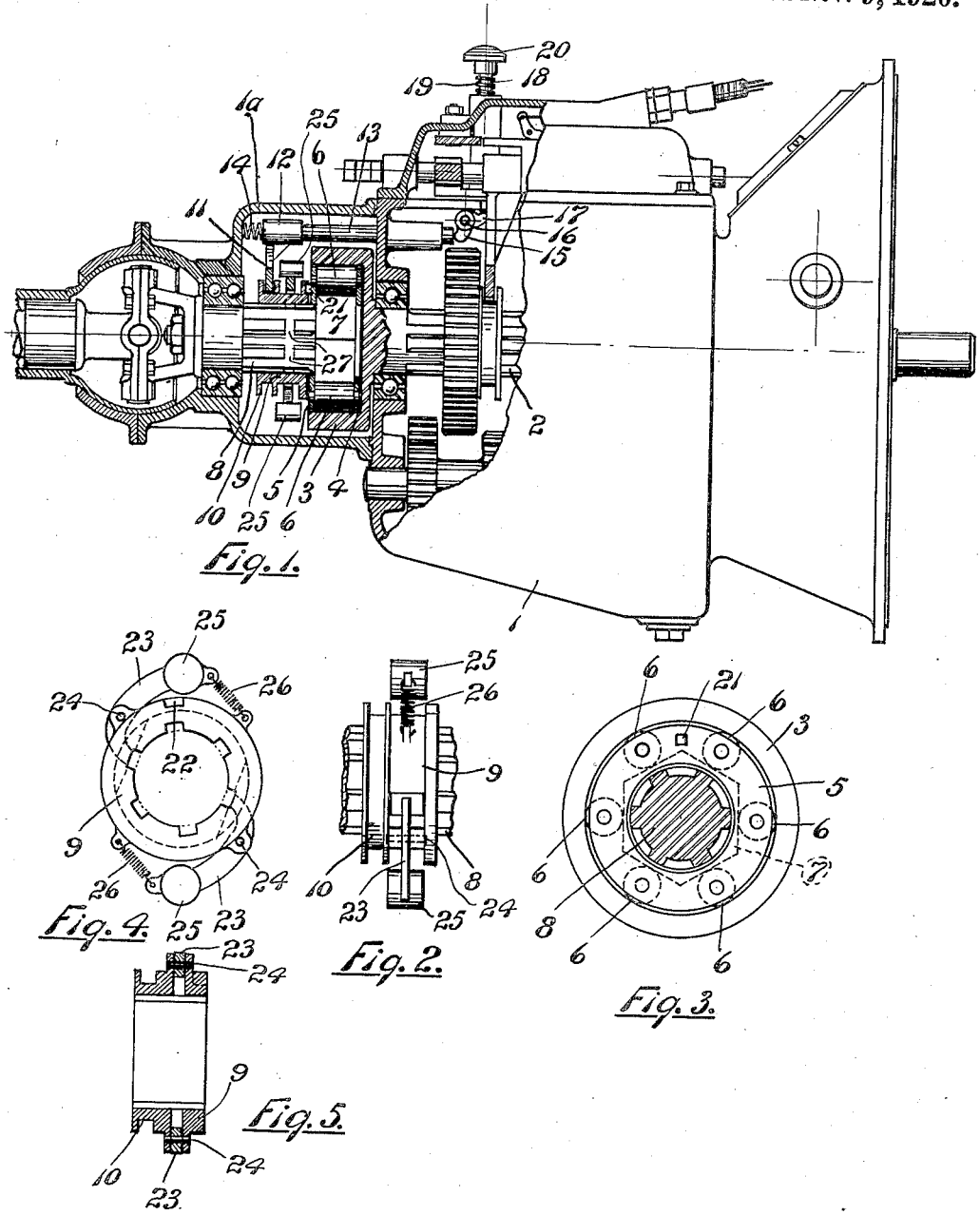

BAYARD E. RICHARDSON AND ALGER M. LYNN, OF GRAND RAPIDS, MICHIGAN, ASSIGNORS TO MECHANO GEAR SHIFT COMPANY, OF GRAND RAPIDS, MICHIGAN, A CORPORATION OF MICHIGAN.

COMBINATION GEAR-SHIFT AND OVERRUNNING CLUTCH AND GOVERNOR THEREFOR.

1,358,655.     Specification of Letters Patent.     Patented Nov. 9, 1920.

Application filed July 26, 1919. Serial No. 313,629.

*To all whom it may concern:*

Be it known that we, BAYARD E. RICHARDSON and ALGER M. LYNN, citizens of the United States of America, residing at Grand Rapids, in the county of Kent and State of Michigan, have invented certain new and useful Improvements in Combination Gear-Shifts and Overrunning Clutches and Governors Therefor; and we do hereby declare the following to be a full, clear, and exact description of the invention, such as will enable others skilled in the art to which it appertains to make and use the same.

This invention relates to a combination gear shift mechanism and overrunning clutch therefor, together with means to govern the movements of the clutch for insurance against a movement thereof which might be detrimental to the gear shifting mechanism, particularly when a change is made from a forward to reverse speed. This invention is of a similar character and is an improvement over that shown in a prior application Serial No. 262,384, filed November 13, 1918 by Bayard E. Richardson. The invention consists of various novel arrangements of parts and constructions for controlling the operation of an overrunning clutch disposed between the sliding gear transmission of a motor vehicle and the drive shaft thereof, so that the same cannot be moved to render the clutch inoperative for overrunning and thus lock the transmission shaft and drive shaft together at any speed over a safe speed, such as ten miles per hour. This operation of the clutch for locking the shafts together is necessary for reverse speed, and the present invention insures against the possibility of changing from a high speed forward to reverse, this being detrimental to the mechanism of the gear shift and, as such reverse speed with the present invention can occur only when the vehicle has slowed down in a forward direction to a comparatively slow speed.

For an understanding of the invention and the construction embodying the same, reference may be had to the following description, taken in connection with the accompanying drawing, in which, Figure 1 is a side elevation, with parts broken away and shown in section illustrating the application of the invention to a sliding gear shifting mechanism.

Fig. 2 is a fragmentary side view of the governing element of the construction.

Fig. 3 is a transverse vertical section taken directly back of the over running clutch, which is shown in elevation.

Fig. 4 is a front elevation of the operating member for controlling the locking of the clutch parts when turning in either direction, and for automatically holding the clutch parts against locking when turning in one direction, said operating member being in different positions for the accomplishment of such results, and Fig. 5 is a vertical longitudinal section through said member, the section passing through the points of pivotal connection of the governor members thereto.

Like reference characters refer to like parts in the different views of the drawing.

In the construction shown, the transmission gearing is located within a casing 1 back of which is an auxiliary casing or housing 1ª in which the clutch and governor therefor are housed. The main shaft 2 of the transmission is driven at different speeds forward and in a reverse direction through the usual system of selective sliding gears mounted on said shaft and on a counter shaft, and preferably, the gears are shifted by means shown in application Serial No. 273,617, filed Jan. 28, 1919 by Bayard E. Richardson. On the rear end of the shaft 2 a hollow cylindrical outer clutch member 3 is formed, the same being open at its rear end to receive the coöperating members of the clutch. The same include front and rear rings 4 and 5 between which a series of spaced apart rollers 6 are located so as to come between the outer wall of the member 3 and the different sides of an inner member 7. As shown the inner member is hexagonal and there are six rollers 6 to be used one between each side of said member 7 and the outer member 3. The dimensions of the rollers with reference to spaces between the sides of member 7 and the outer member 3 are such that when the rollers are located centrally between the corners of the member 7, the outer member may turn freely on the rollers and vice versa, but when the rollers move away from such central position the same practically wedge between the two members 3 and 7 and lock the same together. This is fully explained also in the first application above referred to.

The member 7 is formed on a shaft 8 of short length which is connected by any suitable universal joint connection with the drive shaft of the motor vehicle. A sleeve 9 is splined on shaft 8 directly back of the ring 5. It has a collar 10 at its rear end with which a yoke 11 engages, the same extending upwardly and connecting to a sleeve 12 fixed at the rear end of a rod 13 slidably mounted in a suitable bearing in the rear side of the gear casing 1. The rod is normally impelled in a forward direction by a spring 14. The front end of the rod bears against a downwardly extending finger 15 of a member pivotally mounted at 16 to turn on a horizontal axis, said member also including a forwardly extending finger 17 against which the lower end of a push rod 18 rests. The rod 18 is mounted for vertical movements in a suitable sleeve made with the gear casing 1 and extends above the casing. The rod is normally elevated by a spring 19 disposed between the casing 1 and a head 20 to the rod which is adapted to be operated by the foot to force the rod in a downward direction, this serving to move the sleeve 9 to the rear. A pin or lug 21 projects from the ring 5 and is adapted to enter a slot or recess 22 in the front part of the sleeve 9 and when the sleeve is moved to the rear a complete disconnection of the sleeve and ring 5 is made. When this occurs the clutch members will lock together irrespective of the direction of turning movement of either shaft 2 or 8. But when lug 21 is in recess 22 the clutch members will lock together only when shaft 2 is operated to drive the vehicle in a forward direction. This follows from the fact that the recess is longer than the thickness of the lug 21 and from the further fact that when the lug is at one end of the recess, the rollers 6 are in mid position between the corners of member 7 while when at the other end of the recess the rollers move so as to wedge between the members of the clutch. For reverse drive of the vehicle it is necessary to operate the rod 18 to move the sleeve 9 to the rear as otherwise the outer clutch member would merely turn freely on the rollers. Furthermore when running down a grade the drive shaft of the vehicle may run faster than shaft 2 and operation of the rod 18 is necessary if the engine is to serve as a brake to retard the speed of the vehicle, this being done by interrupting the ignition for the engine cylinders and thus requiring the momentum of the vehicle to compress the charges taken into the cylinders; and this can be done only when the engine and drive shafts are connected.

It is a demonstrated fact that with the gear shift mechanism and means to operate it shown in the second of the above prior applications, the vehicle may be going forward and moving at a considerable rate of speed, and if the reverse selection is operated, the vehicle will come to a stop and then begin immediately to move in a reverse direction. It is best, however, that the speed of the vehicle shall be low as otherwise the strain on the mechanism is too great. If the clutch has all of its parts in operative position so that it will over run, it makes no difference as the change to reverse merely reverses the turning movement of the shaft 2 and has no effect on the drive shaft. Accordingly the device has been provided with a governing appliance which prevents any rearward movement of the sleeve 9 and consequent connection of the drive shaft of the vehicle with the shaft 2 except when the speed has been reduced to a safe limit. This construction comprises two arms 23 pivotally mounted between their ends at 24 on opposite sides of the sleeve 9, the arms being weighted adjacent their outer ends as indicated at 25 and having each a spring 26 attached to said outer end thereof and to an adjacent portion of the sleeve 9. The inner ends of the two arms 23 pass through slots in the sleeve 9 and the various splines on the shaft 8 are cut as indicated at 27 to make a groove around the shaft into which the said inner ends may pass when the rotation of the sleeve reaches a rate of speed sufficient to throw the weighted ends of arms 23 outward against the resistance of the springs 26. When this occurs, it is apparent that rearward movement of the sleeve 9 is blocked as the inner ends of the arms 23 cannot move along the shaft 8 except when they are beyond the points of engagement with the shaft as indicated in dotted lines in Fig. 4. Accordingly there is an insurance against operation of the sleeve 9 to position so that the clutch parts lock irrespective of the direction of turning movement thereof, except when the vehicle is running at low speed. The rate of speed at which the movement to the rear of the sleeve 9 is stopped is dependent on the strength of the springs 26 and the centrifugal force of the weights 25 and this may be adjusted to suit different conditions, though in practice, it has been found that if the forward speed of the vehicle is not over ten miles per hour, the operation for the reverse change of gearing may be made without any likelihood of adverse consequences.

This construction is of value with clutches of this character not only for reverse operations but for preventing accidental operations of the push rod 18 when the vehicle is moving forward and at a time that a change of speed is made in the transmission gearing either forward or reverse. It is imperative or at least very highly desirable that the clutch shall over run when any forward speed change is made and the governor construction insures that at any high speeds no locking of the drive shaft to the transmission shall take place, such that the clutch cannot over run in one direction as desired.

We claim:

1. In combination, a sliding gear transmission including a shaft and gearing whereby the shaft may be driven in a forward direction at different speeds and also in a reverse direction, a clutch disposed between said shaft and the driving shaft of a motor vehicle, said clutch including means for normally connecting the shafts together when the transmission shaft is turning in one direction but not connecting the shafts when the transmission shaft is turning in the opposite direction, means movably mounted adjacent the clutch and associated therewith for preventing connection of the shafts when the transmission shaft is turning in the reverse direction, means for moving said last mentioned means to inoperative position, and means automatically preventing operation of the moving means when the speed of the drive shaft is above a certain predetermined amount, substantially as and for the purposes described.

2. In combination, a sliding gear transmission including a shaft and gearing whereby the shaft may be driven in a forward direction at different speeds and also in a reverse direction, a drive shaft, a clutch disposed between the two shafts, said clutch including means for normally connecting the shafts together, means mounted on one of the shafts and associated with the clutch for limiting the connection of the shafts so that the same will be connected only when the transmission shaft is turning in one direction or the drive shaft in the opposite direction, means for moving said means to inoperative position, and governor means mounted on the first mentioned means for preventing movement thereof to inoperative position when the speed of the drive shaft is beyond a certain amount, substantially as and for the purposes described.

3. In combination, a transmission shaft adapted to be turned in either of two directions, a drive shaft in alinement therewith, a clutch between adjacent ends of the two shafts, said shafts being connected by said clutch, means movably mounted on one of the shafts and associated with the clutch for limiting the operative connection of the shafts to one direction of turning movement of the transmission shaft, means movably mounted on said means automatically operable with the rotation of the shafts to engage with said shaft on which the first means is mounted to prevent movement of the said first means when the shaft is turning above a certain speed, and means for moving said first means to inoperative position when the speed of the shaft is below said certain speed, substantially as described.

4. In combination, a transmission shaft adapted to be turned in either of two directions, a drive shaft in substantial alinement therewith, a cylindrical cup-like clutch member at the rear end of the transmission shaft, an inner clutch member at the forward end of the drive shaft located within the first clutch member and provided with a plurality of angularly disposed sides spaced from the inner side of the first clutch member, a ring located at each side of the inner clutch member, a plurality of rollers disposed between the rings, one at each side of the inner clutch member, means splined on the drive shaft and detachably engaging with one of said rings to hold the rollers against wedging between the two clutch members when the transmission shaft is driven in one direction but permitting such wedging when driven in the other direction, means for moving said first means along the shaft to disengage it from the ring, and means for holding said first means against movement along the shaft automatically operating when the rotative speed of the drive shaft is above a certain amount, substantially as described.

5. In combination, a transmission shaft adapted to be turned in either direction, a drive shaft disposed in substantial alinement therewith coöperating clutch members on the adjacent ends of the two shafts normally locking the same together, a sleeve splined on one of the shafts and adapted to detachably engage with the clutch to prevent locking engagement thereof when the transmission shaft is turning in one direction, means for moving the sleeve away from the clutch to disengage it therefrom, and governor devices mounted on and rotatable with the sleeve for engaging with the shaft on which the sleeve is mounted to prevent movement of the sleeve lengthwise of the shaft when the rotative speed of the shaft is above a predetermined amount, substantially as described.

6. In combination, a transmission shaft adapted to be turned in either direction, a drive shaft in substantial alinement therewith, clutch mechanism between the shafts connecting the same and normally locking the same together, a sleeve splined on one shaft and detachably engaging with the clutch mechanism and operating to hold the same so that the shafts are locked together only when the transmission shaft is turned in one of its directions of turning movement, means normally holding said sleeve and clutch mechanism in engagement, means for moving the sleeve away from the clutch mechanism to disengage the same, governor arms pivotally mounted on the sleeve and having one end of each passing through a slot in the sleeve, the opposite end being weighted so as to throw outward on rotation of the sleeve, and a spring connecting the outer end of each arm to the sleeve and yieldingly resisting the outward throw of the arm, said shaft on which the sleeve is mounted being grooved for the entrance of the inner ends of said arms when the same throw outward, substantially as and for the purposes described.

In testimony whereof we affix our signatures.

BAYARD E. RICHARDSON
ALGER M. LYNN.